United States Patent [19]

Boutin et al.

[11] 4,294,676

[45] Oct. 13, 1981

[54] AQUEOUS MONOMER SOLUTIONS ADAPTED FOR DIRECT PHOTOPOLYMERIZATION

[75] Inventors: Jean Boutin, Mions; Bernard Guenot, Paris; Bruno Jamet, Lyons, all of France

[73] Assignee: Rhone-Poulenc Industries, Paris, France

[21] Appl. No.: 56,337

[22] Filed: Jul. 10, 1979

[30] Foreign Application Priority Data

Jul. 24, 1978 [FR] France ............................ 78 22883

[51] Int. Cl.[3] ............................ C08F 2/10; C08F 2/46

[52] U.S. Cl. ............................ 204/159.23; 422/275; 526/88; 526/235; 526/258; 526/263; 526/287; 526/303.1; 526/312; 526/317

[58] Field of Search .................... 204/159.23; 526/88, 526/235

[56] References Cited

U.S. PATENT DOCUMENTS

| | | | |
|---|---|---|---|
| 3,912,607 | 10/1975 | Communal et al. | 204/159.23 |
| 4,178,221 | 12/1979 | Boutin et al. | 204/159.23 |

*Primary Examiner*—Wilbert J. Briggs, Sr.
*Attorney, Agent, or Firm*—Burns, Doane, Swecker & Mathis

[57] ABSTRACT

Aqueous solutions of olefinically unsaturated hydrophilic monomers are deoxygenated, advantageously pH adjusted, and prepared for direct photopolymerization by photoinitiator addition and countercurrent scrubbing with an inert gas in a contactor column, preferably a packed column.

19 Claims, 1 Drawing Figure

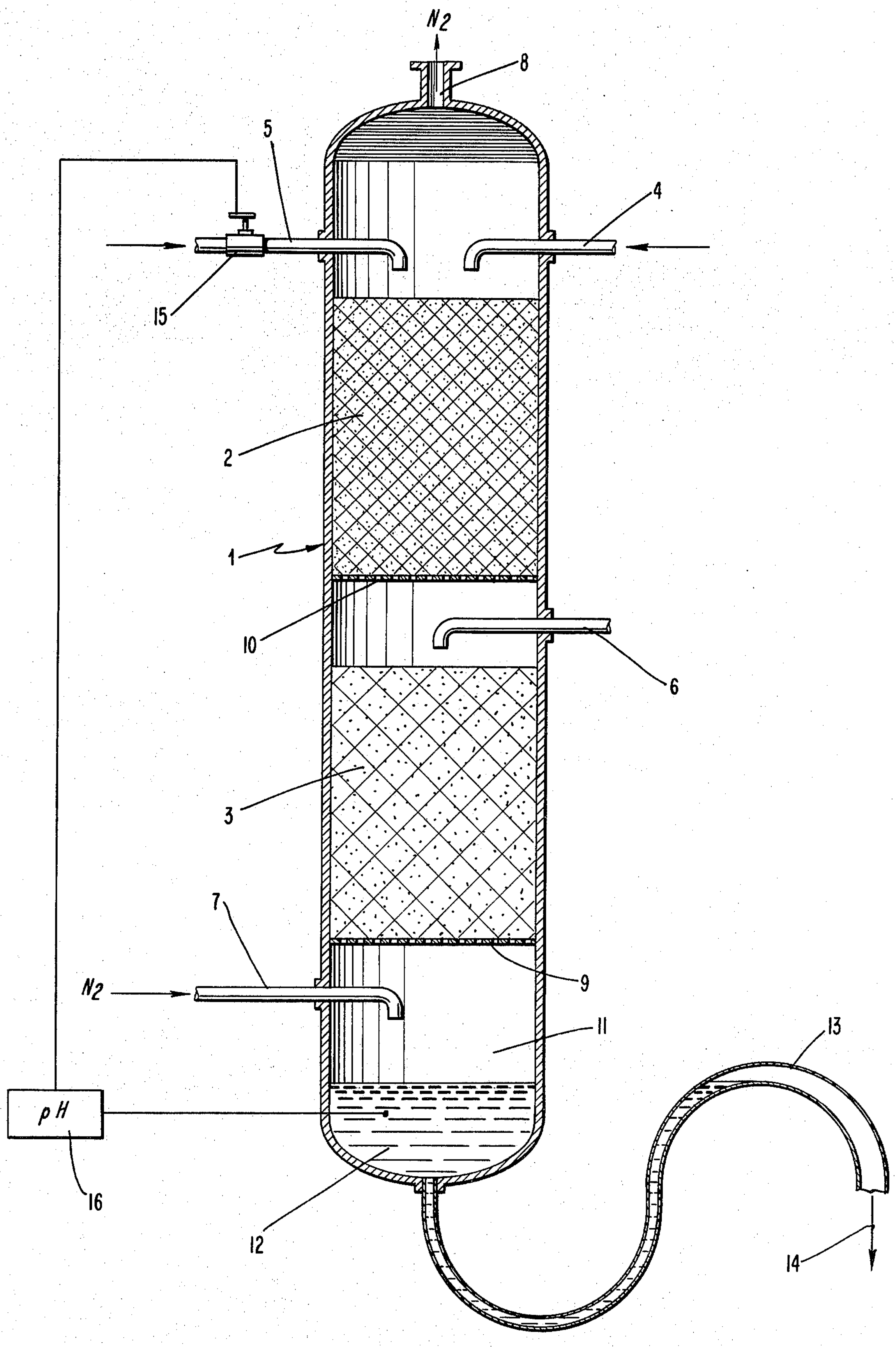
N2
8
5
4
15
2
1
10
6
3
7
N2
9
11
13
pH
16
12
14

AQUEOUS MONOMER SOLUTIONS ADAPTED FOR DIRECT PHOTOPOLYMERIZATION

CROSS-REFERENCE TO RELATED APPLICATIONS

Commonly assigned copending applications, Ser. No. 046,488, filed June 7, 1979, and Ser. No. 046,489, also filed June 7, 1979, each hereby expressly incorporated by reference in its entirety and relied upon.

BACKGROUND OF THE INVENTION

1. Field of the Invention

The present invention relates to the preparation of aqueous solutions of olfinically unsaturated hydrophilic monomers, and, more especially, to the preparation of such monomer solutions well adapted for facile direct photopolymerization into water soluble polymeric flocculants.

2. Description of the Prior Art

It is well known to this art to prepare polymeric flocculants via photopolymerization of acrylic monomers, specifically acrylamide, methacrylamide, acrylic or methacrylic acids, optionally the salts thereof, and quaternary ammonium salts derived from dialkylaminoalkyl (meth)acrylates.

It is characteristically required that such organic polymeric flocculants be soluble in water, that they have high molecular weights (thus, high intrinsic viscosities), that they rapidly dissolve in water, and that they leave no insoluble residue following their dissolution.

And insofar as the preparation of such organic polymeric flocculants is concerned, it is desirable that the polymerization be effected continuously, utilizing solutions which are as highly concentrated as possible, but also that the heat generated during polymerization, or exotherm, be quickly dissipated to avoid polymer degradation.

The aforesaid various requirements, together with several others, have culminated in the preparation of flocculating polymers by means of a process whereby an aqueous solution of monomers, containing a photoinitiator, is continuously deposited in the form of a thin layer onto a mobile support, or endless belt, and there continuously exposed to photopolymerizing irradiation, e.g., ultraviolet (UV) radiation.

The preparation of the aqueous monomer solution, prior to irradiation, nonetheless, itself poses certain technical problems. In fact, in addition to the actual dissolution of the monomers, it is necessary to incorporate in said solutions a photoinitiator and, in certain instances, a base or alkaline agent, such as sodium hydroxide, in order to raise the pH of such solutions.

Furthermore, where it is of advantage to irradiate and photopolymerize in the absence of oxygen, the dissolved oxygen must be removed from the monomer solutions (this oxygen has frequently been introduced earlier, and on purpose, in considerable amounts, in order to inhibit polymerization during storage).

Thus, if the preparation of such monomer solutions is effected without specific precautions or by inadequate methods, various detrimental consequences may be experienced; monomers that are sensitive to the action of alkaline agents may begin to saponify, which ultimately results in flocculating polymers of inconsistent or poor quality; inadequately deoxygenated solutions may be difficult to polymerize; finally and most importantly, there is a contrary risk of premature and "accidental" polymerization within the supply apparatus itself, such polymerization being increasingly dangerous the more advanced the stage thereof; premature and accidental polymerization is even more detrimental, because the equipment is selected and arranged for continuous operation, and there exists, therefore, a risk of the entire installation being blocked, particularly by clogging of the feed and other lines; such premature and accidental polymerization can only be remedied by a shutdown in operation (after several days of production), and thus it is critically necessary to exclude from such solutions any active agents that may initiate or favor any premature polymerization, whether slight or extensive.

Heretofore, the principal means employed for the preparation of the aqueous monomer solutions have been either the direct mixing of the constituents of the solutions, or the utilization of a series of mixers.

However, the direct mixing technique is not suitable when the aqueous monomer solution has been prepared beforehand and the solution then oxygenated in order to enable storage without premature polymerization.

The use of a plurality of mixers, in series, in spite of the advantages thereof (perfect admixture or one reagent being added to a successive reagent), nonetheless, does have its own disadvantages, in particular, the excessive size of the apparatus required; the overly lengthy retention time of the reagents; and the utilization of agitators, stirrers, or any other system of mobile metallic elements is again not feasible, because same may favor the aforediscussed premature polymerization.

SUMMARY OF THE INVENTION

Accordingly, a major object of the present invention is the provision of an improved process for the rapid preparation of aqueous solutions of hydrophilic monomers, such solutions adapted to be directly photopolymerized into water soluble polymeric flocculants.

Another object of the invention is the provision of aqueous monomer solutions adapted to be directly exposed to UV radiation without further treatment.

Yet another object of the invention is to provide monomer solutions which are well deoxygenated and which are characterized by constant pH.

Another object of the invention is to provide photopolymerizable aqueous monomer solutions, while at the same time avoiding those disadvantages heretofore plaguing the art, which solutions are immediately ready for exposure to UV radiation without having to be formulated by means of mechanical apparatus which would include agitators, stirrers, or other moving parts.

Still another object of the invention is to reduce to a minimum that period of time required for the transformation of a storage-stable aqueous monomer solution into an aqueous monomer solution itself ready for polymerization.

Other objects of the invention will become apparent from the description which follows.

Briefly, it has now been determined that all of the foregoing objects of the invention can readily be attained by preparing the subject aqueous solutions of olefinically unsaturated hydrophilic monomers destined for e.g., direct, continuous thin layer photopolymerization induced by UV radiation such that, first, an aqueous solution of said monomers is introduced through the top of a contactor column; next a photoinitiator is introduced into the same column; then an inert gas is counter-currently introduced at the base of the column, said inert gases ascendingly circulating up through the column, and the liquid solutions downwardly descending therethrough; thence, the inert gas exits through the top of the column and the ready to use monomer solution (i.e., directly ready for UV photopolymerization) is recovered from the base thereof.

BRIEF DESCRIPTION OF THE DRAWING

The FIGURE of Drawing is a schematic cross-sectional view of a separator/contactor column suitable for carrying out the process according to the invention.

DETAILED DESCRIPTION OF THE INVENTION

More particularly according to this invention, the preparation column utilized consistent herewith is preferably a packed column. And the aqueous monomer solution which is introduced at the top of the column is a simple solution, essentially comprising but water and the monomers; most frequently the solution introduced is a storage-stable solution, i.e., a solution having a high content of dissolved oxygen, close to saturation levels.

Because it is desirable to employ a monomer solution having a predetermined basic pH value, the process of the invention is completed by introducing an aqueous solution of an alkaline agent at the top of the column, by continuously monitoring the pH of solution directly ready for photopolymerization which is recovered from the base of the column, and by regulating the flow rate of introduction of said aqueous solution of alkaline agent in response to such continuous monitoring, whereby the pH of the monomer solution is automatically maintained at any desired value.

Representative of alkaline agents suitable for the pH adjustment according to the invention are the hydroxides, particularly sodium or potassium hydroxide, or ammonium hydroxide (ammonia); the alkaline salts thereof are also envisaged.

The photoinitiator is introduced into the column typically in solution form; same may be introduced through the top of the column, but, preferably, it is introduced into the lower half of the packed column. In any event, it is preferred that the photoinitiator is introduced above the bottom of the packing, at a height corresponding to at least one fifth of the total height of the packing.

The packed column may be of any known type. However, the column is advantageously set up such that, in use, the holdup volume is maintained between 5 and 50% of the total internal volume of the column in the zones comprising the packing and in the volume located above said packing, and is preferably, maintained between 5 and 40% thereof. The "holdup" of the column is the volume of liquid present, during distillation, in that volume of the column comprising the packing and that located above said packing.

It is also preferred to utilize columns devoid of "dead" zones, i.e., zones wherein the liquid may stagnate. Insofar as the packing, per se, is concerned, any type of packing may be used which simultaneously ensures good gas/liquid contact, the absence of stagnant zones and permits good circulation of the liquids and gases; representative are, for example, glass, polyolefins, polyfluoroolefins, polyamides, polyesters, polycarbonates, polysulfones. The packing material, moreover, may take any one or more of a number of different geometric forms, e.g., spheres, spirals, cylinders with broken wall areas, helical coils, etc.

The packing material is conveniently merely supported by a grating member which maintains it in place; the mesh of the grating has a minimum dimension typically greater than 0.5 mm, preferably greater than 3 mm.

In a preferred embodiment of the invention, the upper volume of the packing material is comprised of fine particle sizes (fine packing) and the lower volume thereof of large sizes (coarse packing). The two size zones may be dissociated (i.e., separated by a zone without packing). The coarse packing typically is of a size at least 1.2 times greater than that of the fine packing, preferably 1.5 to 5 times greater. However, it is also possible to utilize two packings having the same particle size.

The walls of the packed column are advantageously internally smooth; it is also preferred that they be opaque or rendered opaque. If same consist of a transparent material, it is thus preferred that they be covered or coated with an opaque material, for example, a black material. Said wall members are desirably equipped with peepholes which can be opened and closed for internal viewing. Representative materials from which the column walls may be constructed are glass and various polymers, including the polycondensates.

In another preferred, but not critical, embodiment of the invention, the several liquids and gases are supplied to and introduced into the column by means of "immersed" feed lines or conduits, i.e., conduits, one end of which penetrates into the column and is downwardly directed therein.

With respect to the operation of the column, certain other functional arrangements and conditions should be observed. Thus, functional arrangements are typically established such that the space just beneath the grating which supports the packing comprises a gaseous zone (the term including vapors); under these conditions, the liquid descending the column successively encounters the packing, the grating, the zone comprising the gaseous phase and ultimately, at the base of the column, the liquid phase consisting of the monomer solution directly ready for exposure to the UV radiation. It is also preferred that the uppermost regions of the packing not be covered by, or immersed in, the liquid phase.

It is also preferred that the monomer feed from the column to the moving endless belt, whereat the exposure to the UV radiation is effected, be conducted without utilizing any pumping mechanism. This can conveniently be accomplished by means of a bent or convoluted feed line thus defining a siphon type system functioning as an overflow; in such a system the base of the packed column is occupied by the monomer solution directly ready for UV irradiation and this solution is constantly withdrawn by means of the bent feed line, with the uppermost section of the elbow defined by the bend being at a height lower than the grating supporting the packing, which permits the maintenance of a gaseous phase under the grating. Furthermore, the diameters of the various lines are selected such that the flow of the liquid being withdrawn through the bent conduit occurs without surging, but rather in a regular and uniform manner.

In the FIGURE of drawing is depicted suitable apparatus for carrying out the process according to the present invention.

In the apparatus of the FIGURE of drawing, the column 1 is partially filled wth a packing 2 and a packing 3. The packing 2 is advantageously fine and the packing 3 advantageously more coarse; but it is also envisaged to use the same sized packing for both 2 and 3. At the top of the column, through the feed line 4, an aqueous solution of an olefinically unsaturated monomer containing dissolved oxygen is introduced into the column; through line 5 the hydroxide is introduced; through line 6 the photoinitiator; and the nitrogen or inert gas enters the column via line 7 and exits therefrom through the line 8. The grating 9 supports the lowermost volume of packing 3, the packing in this particular embodiment being divided into two distinct volumes, and a second grating 10 supports the uppermost volume of packing 2. At the lower end of the column as defined, a gaseous phase 11 and, at the very bottom, the monomer solution 12 ready for UV irradiation is collected. The bent conduit 13 insures that the flow of the monomer solution 12 be in the direction 14 of the moving endless belt upon which the tin layer UV photopolymerization is effected. The device 16 on the one hand continuously measures and monitors the pH of the solution 12 and, on the other, based on and directly responsive to such measurement, controls the feed of sodium hydroxide (aqueous solution) through the line 5 by means of valve 15.

The nitrogen may be replaced by any inert gas, for example, argon. The respective flow rates of the nitrogen and the liquid feeds are selected such that the content of dissolved oxygen in the monomer solution destined for irradiation and photopolymerization is typically less than 0.1% of saturation, preferably less than 0.01%, or, most preferably, less than 0.005% (percentages by weight).

The reactant olefinically unsaturated monomers comprise at least 50% by weight, and preferably at least 80% by weight, of hydrophilic acrylic monomers.

Representative of those monomers especially adapted for photopolymerization according to the invention are: acrylamide, methacrylamide, acrylic acid, methacrylic acid, methallysulfonic acid, and vinylbenzenesulfonic acid and the soluble salts or esters thereof, particularly the alkali metal or ammonium salts, N-vinylpyrrolidone, methyl-2-vinyl-5-pyridine and the aminoalkyl acrylates and methacrylates; these latter compounds are preferably quaternized and preferably contain 4 to 16 carbon atoms in their respective aminoalkyl moieties. Photopolymerization of the aforesaid monomers, wherein individually or in any admixture thereof, results in homopolymeric or copolymeric flocculating agents, the nature and proportions of such monomers naturally being selected as to effect preparation of water soluble polymers; thus, acrylonitrile and methacrylonitrile may also be used as comonomers, but the content thereof is preferably limited with respect to the other monomers to less than 3% by weight.

The preferred monomers are acrylamide, acrylic acid and the alkali metal salts thereof, and the quaternized dialkylaminoalkyl methacrylates [in chloride or sulfate form].

The concentration of monomer(s) in the aqueous monomer solution subjected to photopolymerization per the invention is typically comprised between 30 and 90% by weight. For acrylamide and the various acrylates, the concentration is typically between 30 and 70%, preferably between 40 and 60% by weight. In the case of the quaternized ammonium salts, particularly those derived from aminoalkyl methacrylates, the concentration typically is between 40 and 90%, preferably between 70 and 88% by weight. In the case of acrylamide in combination with the quaternized aminoalkyl methacrylate salts, the concentration of same in the aqueous monomer solution is typically between 40 and 70% by weight, and preferably between 45 and 65% by weight.

The promoters of the photopolymerization, or photoinitiators, are themselves known. Specifically, the following are noted as representative: diacetyl, dibenzoyl, benzophenone, benzoin and its alkyl ethers, in particular its methyl, ethyl, propyl, isopropyl ethers. The photoinitiator content of the initial monomer solution exposed to photopolymerization is typically between 0.005 and 1% by weight of the monomer or monomers, preferably between 0.01 and 0.5% by weight. Anthraquinone polymerization additives may also be used, as described in French Pat. No. 2,327,258.

The mobile support upon which the aqueous monomer solution to be polymerized is deposited, advantageously comprises an endless conveyor belt, or, in certain embodiments, several endless conveyer belts in series [the second conveyor belt is utilized only upon solidification of the photopolymerized medium]. The thickness of the aqueous solution subjected to photopolymerization is typically between 2 and 20 mm, preferably between 3 and 8 mm. The mobile support is preferably water repellent,; suitable materials comprising the support include the polyperfluoroolefins [homo- or copolymers], and metals [either with or without a covering layer of a water repellent film, such as, for example, a polyester film].

In order to eliminate or dissipate the heat produced during photopolymerization, it is advantageous to cool the mobile photopolymerization support. Cooling is conveniently effected at the lower surface of the mobile support by means of spraying same with cold water. The temperature of the polymerization medium is maintained below approximately 75° C., preferably below 65° C. However, it is possible to dispense with the cooling, in particular after a high proportion of the monomers has already polymerized, for example, when the residual monomer content is less than 10%, preferably lessthan 2% [by weight with respect to the mass exposed to photopolymerization]. The pH of the aqueous monomer solutions exposed to photopolymerization typically is between 4 and 13. The specific value of the pH depends on various factors, specifically on the particular monomer used and the resultant molecular weights desired, and also on the impurities contained in the monomers. Generally, by raising the pH, cross-linking of the highest molecular weight fractions is prevented [cross-linking giving rise to insoluble fractions], but excessively high pH's are to be avoided, in light of the fact that the monomers are susceptible to saponification.

In the event that anionic organic polymers (cation exchangers, such as for example, copolymers of acrylamides and alkaline acrylates) are prepared, the pH of the monomer solution is typically greater than 9 and more frequently greater than 10.

Per all of the foregoing, the invention features exposing an aqueous solution of olefinically unsaturated hydrophilic monomers to photopolymerizaton under the aforenoted conditions. However, it should be understood and it is quite apparent that the photopolymerization medium is only initially in the state of an aqueous solution having the aforesaid character and concentrations; rather, as the photopolymerization progresses, the photopolymerization medium becomes increasingly viscous, until it becomes solid. Nonetheless, in a preferred embodiment of the invention, the ambient atmosphere enveloping, or at least surmounting the medium of photopolymerization, is continuously maintained moist and humid according to that technique disclosed and claimed in the aforenoted copending application, Ser. No. 46,489.

The photopolymerization itself may be effected in one or more than one stage; one stage may proceed under the UV irradiation until the content in residual monomer has diminished to the desird value. Thereafter, per the foregoing, the irradiation may be continued without the necessity for cooling the traveling belt and even in the presence of oxygen.

Consistent with the foregoing preferred embodiment, the atmosphere surrounding the polymerization recipe subjected to photopolymerization is at least initially humid and preferably oxygen free. Such humid atmosphere is conveniently established simply by circulating or flushing appropriate gaseous stream over the liquid or solid medium of photopolymerization, said gaseous stream, e.g., of nitrogen, having been first bubbled through an aqueous liquid, preferably water, to impart the water vapor content thereto. An oxygen free atmosphere as intended herein is one which contains less than 5% oxygen by volume, preferably less than 0.5%; such as atmosphere is established, for example, also via an inert gas flush.

Various photopolymerization additives may also be included in the photopolymerizable, aqueous monomer solutions, particularly notable being the solubilization enhancing polyhydroxy compounds, especially those comprising at least two secondary alcohol functions and at least one carboxyl and/or carboxylate salt functions, as disclosed and claimed in the aforenoted copending application, Ser. No. 46,488. The alkali metal gluconates are especially preferred. Such additives may conveniently be incorporated, also by introduction through suitable feed means into the top of the packed column, or same may directly be added to the monomer solution itself introduced to the top of the column.

The polymeric flocculants prepared from the aqueous monomer solutions according to the invention are especially attractive for the flocculation of waste and other impure waters, and industrial and other effluent.

In order to further illustrate the present invention and the advantages thereof, the following specific example is given, it being understood that same is intended only as illustrative and in nowise limitative.

EXAMPLE

A packed column corresponding to that depicted in the FIGURE of drawing was utilized, the same having a diameter of 15 cm and a height of 185 cm.

The height of the upper volume of packing was 100 cm.

The height of the lower volume of packing was 20 cm.

Same was covered with an opaque black film.

Both the upper and lower volumes of packing consisted of glass helices, these being helical glass coils generally cylindrical in form and each being about 9 mm in diameter.

At the head of the column, there was introduced 369 l/h of a monomer solution formulated from 1364 kg demineralized water, 351 kg acrylic acid (97% pure, the remainder being water), 378 kg of an aqueous solution of caustic soda (concentration, 50% by weight), 950 kg acrylamide, and 34 kg glycerol.

An aqueous solution of sodium hydroxide was also introduced to the head of the column, through a separate feed line, the pH of which being adjusted to 11.

In the interspace established between the two volumes of packing, a photoinitiator solution (0.45 kg benzoin isopropyl ether in 13 kg methanol) was introduced at a rate of 2.1 l/h.

A nitrogen flow was countercurrently established, via introduction thereof through the base of the column, at a rate of 4.5 $m^3$/h. The oxygen content of the monomer solution introduced at the head of the column corresponded to saturation level, while at the base of the column the solution directly ready for photopolymerization had an oxygen content of less than or equal to 0.2 ppm (parts per million).

The temperature employed was ambient temperature (approximately 23° C.).

There was no premature polymerization in evidence, even over continuous and extended operation. The installation was therefore quite small in size and the monomer solution had a very low oxygen content when recovered from the base of the apparatus.

Inside the column, the liquid did not completely cover the upper volume of packing and at the base thereof it gathered in a pool, as indicated in the FIGURE of drawing.

The monomer solution exiting the apparatus and adapted for direct photopolymerization was subsequently deposited in a thin layer (thickness: 4.5 mm) onto a traveling endless belt and irradiated with ultraviolet rays (low pressure mercury lamps) over a width of 1.08 m for 15 mn.

After drying and grinding, a copolymer soluble in water, and having an intrinsic viscosity of 18 dl/g, was obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of an aqueous monomer solution adapted for direct photopolymerization into water soluble polymers, comprising deoxygenating and countercurrently scrubbing an aqueous solution of olefinically unsaturated hydrophilic monomer with an inert gas in a packed column, and concurrently adding a photopolymerization inducing amount of photoinitiator to said aqueous solution.

2. The process as defined by claim 1, further comprising concurrently adjusting and maintaining constant the pH of said aqueous monomer solution.

3. The process as defined by claims 1 or 2, said aqueous solution of olefinically unsaturated monomer having a high content of oxygen dissolved therein.

4. The process as defined by claim 3, said oxygen content being near saturation level.

5. The process as defined by claim 3, said concurrent pH adjustment and constant maintenance being effected via the controlled addition of alkali.

6. The process as defined by claim 5, said alkali being an hydroxide.

7. The process as defined by claim 1, wherein the packing in said column is layered.

8. The process as defined by claim 7, the column holdup being between 5 and 50%.

9. The process as defined by claim 8, the column holdup being between 10 and 40%.

10. The process as defined by claim 8, the column being smooth-walled, opaque, devoid of stagnant zones, and the packing being nonporous and supported on grates.

11. The process as defined by claim 8, a gaseous zone being established beneath each layer of packing, and the deoxygenated, scrubbed monomer solution being collected at the base of the column 12. The process as defined by claim 11, the column including means for withdrawing the treated monomer solution therefrom without pumping action.

13. The process as defined by claim 11, the collected monomer solution having an oxygen content of less than 0.01%.

14. The process as defined by claim 13, the collected monomer solution having an oxygen content of less than 0.005%.

15. The process as defined by claim 13, the olefinically unsaturated monomer being selected from the group consisting of acrylamide, methacrylamide, acrylic acid, methacrylic acid, methallylsulfonic acid, vinylbenzenesulfonic acid, the salts and hydrophilic esters thereof, N-vinylpyrrolidone, methyl-2-vinyl-5-pyridine, aminoalkyl acrylate, aminoalkyl methacrylate, and quaternary aminoalkyl acrylate and methacrylate.

16. The process as defined by claim 15, said monomer being selected from the group consisting of acrylamide, acrylic acid, alkalic metal salts thereof, and the quaternized dialkylamino methacrylates having from 4 to 16 carbons in the respective aminoalkyl moieties thereof.

17. The process as defined by claim 15, the collected monomer solution having a monomer concentration between 30 and 90% by weight, and a photoinitiator concentration between 0.005 and 1% by weight.

18. The process as defined by claim 17, the photoinitiator concentration being between 0.01 and 0.5% by weight.

19. The process as defined by claim 17, further comprising directly depositing a thin layer of the collected monomer solution onto a traveling support, and thence exposing such thin layer to photopolymerizing irradiation.

* * * * *